United States Patent [19]
Neuner

[11] 3,888,772
[45] June 10, 1975

[54] COMMUNICATION BETWEEN REDUNDANT PROTECTION AND SAFEGUARDS LOGIC SYSTEMS WITHIN NUCLEAR REACTOR POWER PLANTS BY MEANS OF LIGHT

[75] Inventor: James A. Neuner, Pittsburgh, Pa.

[73] Assignee: Westinghouse Electric Corporation, Pittsburgh, Pa.

[22] Filed: Apr. 4, 1972

[21] Appl. No.: 240,938

[52] U.S. Cl. .................. 250/199; 176/20; 176/38; 250/211 J
[51] Int. Cl. ............................................. H04b 9/00
[58] Field of Search ............................... 176/19–25, 176/38; 250/199, 211 J

[56] References Cited
UNITED STATES PATENTS

| | | | |
|---|---|---|---|
| 3,437,556 | 4/1969 | Bevilacqua et al. | 176/19 R |
| 3,486,029 | 12/1969 | Barrett et al. | 250/199 |
| 3,493,760 | 2/1970 | Hoadley | 250/199 |
| 3,506,830 | 4/1970 | Love III, et al. | 250/211 J |

Primary Examiner—Howard W. Britton
Assistant Examiner—Marc E. Bookbinder
Attorney, Agent, or Firm—D. C. Abeles

[57] ABSTRACT

An improved nuclear reactor protection and safeguard system is disclosed having a plurality of sensors for monitoring reactor and environmental parameters associated with reactor operation. The sensor outputs are communicated along two substantially similar isolated trains of logic to a logic function which interprets the monitored signals. Upon the occurrence of a predetermined combination of the monitored signals the protection and safeguards system actuates corresponding safeguards and protection mechanisms associated with the reactor to control and protect against the occurrence of an adverse reactor operating condition. The improvement provided maintains both physical and electrical insulation between the two trains of logic while enabling communication between the trains of the information contained therein where necessary by means of light.

9 Claims, 4 Drawing Figures

COMMUNICATION BETWEEN REDUNDANT PROTECTION AND SAFEGUARDS LOGIC SYSTEMS WITHIN NUCLEAR REACTOR POWER PLANTS BY MEANS OF LIGHT

CROSS REFERENCE TO RELATED APPLICATIONS

The present application is related to the invention described in copending applications Ser. No. 241,038 (W. E. Case No. 42,844) entitled Universal Programmable Logic Function, filed Apr. 4, 1972; copending application Ser. No. 240,939 (W. E. Case No. 43,136), entitled A Cyclic "OR" Monitoring System For Displaying The Outputs of Two Substantially Similar Trains of Logic, filed Apr. 4, 1972, and copending application Ser. No. 241,049 (W. E. Case No. 43,137), entitled A Programmable Tester For Protection and Safeguards Logic Functions, filed Apr. 4, 1972, and copending application Ser. No. 241,048 (W. E. Case No. 43,204), entitled Self-Optimizing Biasing Feedback for Photoelectric Transmission Systems, filed Apr. 4, 1972. All the aforementioned applications have a common inventor in the invention of the subject application and are assigned to the assignee thereof.

BACKGROUND OF THE INVENTION

The present invention pertains in general to a nuclear reactor safeguard and protection system and more particularly, to such a system that maintains physical and electrical isolation through the use of photoelectric devices.

The present day operation of nuclear power plants requires redundant protection and safeguard systems to protect the public and the equipment in the unlikely event of an adverse reactor operating condition or nuclear accident. At present, an electromechanical protection and safeguard system is used between the nuclear sensors, which are employed to detect such a condition, and the actuation mechanisms, such as shutdown rods, containment sprays, safety injection systems, emergency diesel start-ups, etc., which are employed to control such a condition. Electromechanical protection and safeguard systems utilize two identical trains of logic, each receiving approximately 200 signals from four bistable channels. Either logic train is capable of initiating the required actuations to protect personnel and equipment. Each logic train and each bistable channel is electrically and physically separated from all others and periodically tested so that no single failure, as defined by governmental regulation, can prevent a required actuation of the safety control systems when required.

At present, each input signal controls at least one BF relay. The logic is performed using various configurations of electromechanical contacts. In order to maintain the required isolation, separate contacts must be used for monitoring purposes (computer, status lights and/or annunciators) and a separate pair of field wires to each destination for each signal is required. An additional one and sometimes two relays per input signal per train are used to test the system.

To be sure that no single failure can prevent the necessary actuations via both logic trains, the two logic trains must be completely separated, electrically and physically. However, at certain points in the system communication between the two trains must continue without defeating the isolation. Previous systems obtained the required isolation by means of either relays or transformers. Such systems employed either coil-to-contact and contact-to-contact or transformers to maintain the required isolation.

Such systems exhibit all the disadvantages associated with electromechanical systems such as large physical size; large overall power requirements; low reliability; susceptibility to seismic vibrations; high maintenance costs; slow responses; and large amounts of expensive field wiring. Furthermore, isolation achieved by utilizing transformers, which rely upon the separation of the primary and secondary windings, while providing adequate DC isolation does not provide complete AC isolation. Consequently, a signal of sufficient magnitude and duration can be passed in either direction providing the possibility of a catastropic failure of both logic trains. A transformer cannot pass a DC signal. The resulting circuitry required to convert DC signals to AC signals and then back to DC signals to provide the necessary communication between logic trains adds to the complexity of such systems, resulting in reduced reliability and increased cost.

Thus, a new and improved reactor protection and safeguard logic system is desired to provide communication between redundant logic trains in such a manner as to maintain complete electrical and physical separation of these trains. In addition, a high degree of reliability must be maintained and the components chosen must be compatible with a multiplexing subsystem to reduce the number of isolation units and field wiring.

SUMMARY OF THE INVENTION

This invention obviates the disadvantages of the prior art by providing an improved nuclear reactor protection and safeguard system having a plurality of sensors for monitoring reactor and environmental parameters associated with reactor operation. The sensors respectively provide an output representative of the monitored parameters which is communicated along two substantially similar isolated trains of logic to a logic function. The logic function interprets the monitored signals and upon the occurrence of a predetermined combination thereof activates corresponding safeguards and protection mechanisms associated with the reactor to prevent the occurrence of an unsafe reactor operating condition.

Improved isolation between logic trains is accomplished employing photoelectric devices to maintain the total separation between redundant logic trains when communication between those trains is required. Additionally, conditioning of the multiplex signals for transmission over long multiconductor cables is provided to each of separate decoder units.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Within all nuclear power plants, some form of protection and safeguards system exists. The purpose of the system is to monitor specific points within the plant and under certain predetermined conditions to command the actuations required to protect both personnel and equipment. Since this system insures the safe operating status of nuclear power plants under fault conditions, it must be designed to meet the single failure criteria set by Governmental regulation. Accordingly, two trains of identical logic (binary coded signal trains in this example) are provided which receive identical signals and control separate actuators. Each train is periodically tested to assure that no single failure can prevent the necessary actuations via both logic trains. Additionally, the two logic trains are completely separated, electrically and physically, to assure that in the event of a single failure of either train the other train will provide the necessary actuations. In order to accomplish this end, this invention provides communication between the redundant protection and safeguard logic trains by means of light. In this way, total electrical and physical separation of the redundant trains is maintained within the ambit of Governmental regulation.

Such a protection and safeguard logic system has previously been generally described in copending application Ser. No. 241,038 (W. E. Case No. 42,844), entitled Universal Programmable Logic Function.

Figure 1:
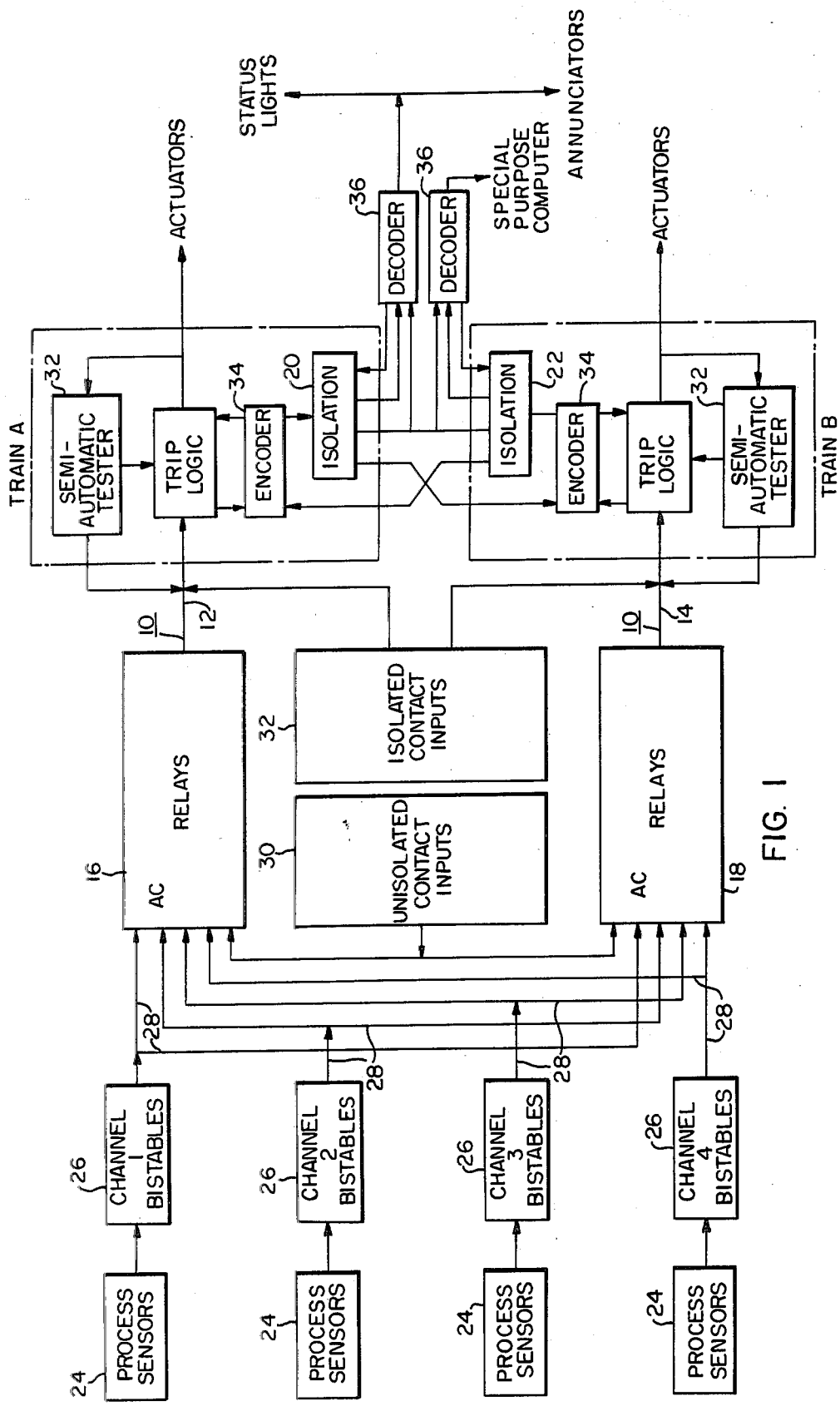
FIG. 1 is a system block diagram illustrating the general arrangement of elements comprising the protection and safeguard systems of this invention.

As an illustrative example, FIG. 1 provides a block diagram of a general arrangement of solid state protection and safeguards system components contemplated by this invention. In its more detailed aspects the solid state reactor protection and safeguards logic system is composed of two identical, isolated, redundant trains of logic 10. Complete physical and electrical separation of the respective trains, denoted by corresponding reference characters 12 and 14, is accomplished by virtue of coil to contact separation provided by AC relays 16 and 18, photodiode coupled pairs, 20 and 22, and physical separation of wiring as generally illustrated.

Signals originating at the sensors 24 are in themselves redundant inasmuch as separate sensors are used to monitor the same or related parameters. The analog signals produced by the process sensors 24 are converted to digital form by four channels of bistables 26. In order to maintain separation of the redundant signals, one signal output 28 from each bistable 26 controls two small AC relay coils, one within each of the respective AC relay units 16 and 18, corresponding to the two separate logic trains 12 and 14, respectively. The coil to contact separation of these AC relays assures separation of each bistable channel and each logic train from all others. The AC relays are grouped according to their bistable channel association within the separate AC relay units 16 and 18. In this way, separation of bistable to relay coil wires can be maintained. Signals originating at single contacts or solid state devices must enter each logic train via small AC or DC relays 30 as if associated with a bistable channel in order to maintain complete separation. Signals already existing at two isolated outputs (e.g. separate contacts) may be considered already isolated and be brought directly into each logic train as illustrated by isolated contact inputs block 32.

Each logic train receives exactly the same information. Upon the proper combination of inputs and sequence of events, either logic train is capable of actuating the proper equipment to take corrective action as interpreted by the logic function, a circuit designed to perform the prearranged reactor trip logic, generally shown by the reference block marked trip logic, more fully described in copending application Ser. No. 241,038 (W. E. Case No. 42,844).

A semiautomatic tester within each train is provided to periodically check the respective trains more thoroughly than was previously possible. A detailed description of the semiautomatic tester denoted by reference character 32 in FIG. 1 is described in copending application Ser. No. 241,049 (W. E. Case No. 43,137). The use of a single universal programmable logic circuit as described in copending application Ser. No. 241,038 (W. E. Case No. 42,844) to perform all trip logic and the semiautomatic testing features improves system maintenance and enhances reliability by minimizing test and repair time.

To reduce field wiring, most information sent to the reactor control room and computer is first encoded by a redundant, synchronized multiplexing system designated by reference character 34. Such encoding units are well known in the art. The information thus encoded is then sent to a decoder 36 via the isolation units 22 of this invention. The decoders 36, normally located within the reactor control room, memorize the information and display it in a DC manner to the appropriate output devices, including special purpose computer inputs, status lights and annunciators. All information is typically updated approximately every 4 ms.

Figure 2:
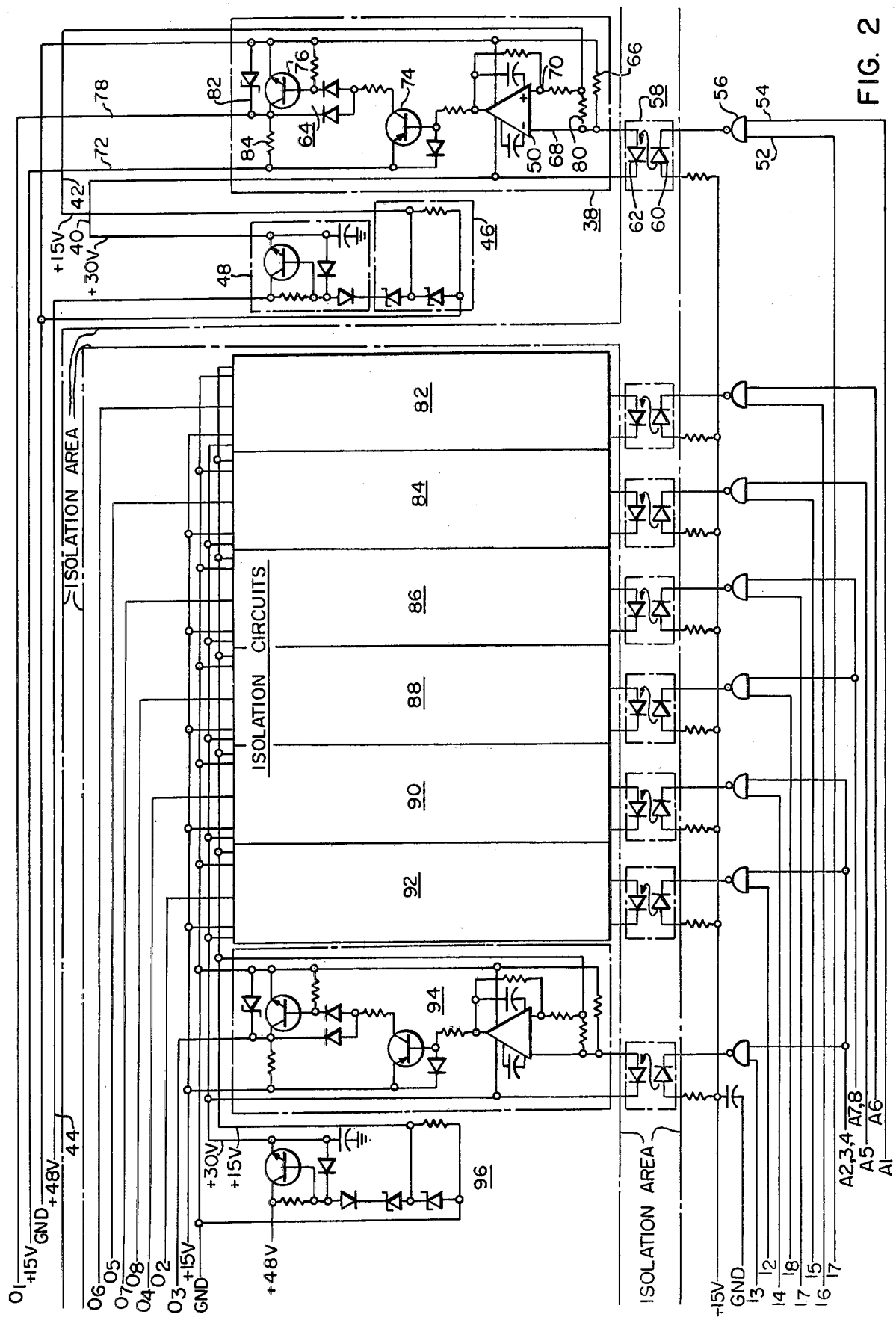
FIG. 2 is a schematic circuitry diagram illustrating one embodiment of a plurality of photoelectric isolation units which can be employed in the system of FIG. 1.

A total of eight isolation cards containing the isolation circuits schematically illustrated in FIG. 2 are normally required for a standard four loop reactor plant- four per redundant train. Their purpose is to maintain the total separation required between redundant logic trains when communication between those trains is required, as well as conditioning of the multiplex signals for transmission over long multiconductor cables to each of the decoder units 36.

The logic function performed by each of the eight identical isolation circuits illustrated in the exemplary embodiment shown in FIG. 2 is similar to that of a two input high threshold NAND gate with the added advantage of enhanced isolation between input and output of up to 2,500 volts, and an output capability of sinking much more current than any of the normal high threshold logic gates. According to the exemplary circuitry illustrated, a logical zero on either of the inputs designated by reference characters $I_1$ through $I_8$, respectively, guarantees a logical one on the output designated by reference characters $O_1$ through $O_8$, respectively. One input of each circuit is brought out respectively for multiplex signals, addresses, and a strobe signal, while several of the second inputs to each isolation circuit are paralleled together and designated for use by an A + B test function to save connector pins. The address signals indicate by their particular combinations the digital signals being transmitted at that moment in time. The strobe signal is a pulse half the width of each address period and centered within each address. The strobe is employed to enable the appropriate memory selected by the address lines to memorize the information present at that moment in time. Since the strobe signal is centered within the address period, all transient conditions have settled out before the memorization begins. The connection of the A&B signal to the second inputs allows either train, upon command to alternately blank information first from one train, then from the other, thus allowing the complete test of each train without inhibiting the ability of either, at that time, to independently command the appropriate actuation of the protection and safeguards mechanisms. This function is more fully described in application Ser. No. 240,939 (WE 43,136). Additionally, one of the isolation circuits, set off and designated by reference character 38, is not only isolated from all the inputs but also from all other seven isolation circuits.

The isolation circuit illustrated in FIG. 2 is best described by an explanation of the operation of circuit 38, with the understanding that the operational description applies to each of the other seven circuits as well except where specifically noted.

Some exemplary values are provided in the description of the circuit of FIG. 2 as an illustrative aid in understanding the operation of the instant invention, though it is to be understood that this is not a limitation of this invention. For that purpose, a +30 and +15 volt DC power supply is provided via electrical conductors 40 and 42, respectively, derived from a +48 volt voltage supply brought into the circuit at terminal 44. These voltages are provided to supply the power requirements of operational amplifier 50 and are derived respectively from a series regulator 48 and Zener reference 46.

Normally, few if any input error signals exist within a nuclear reactor plant. Under this condition, the signal inputs to the isolation board provided at terminals $I_1$ through $I_8$, respectively, assume a logical zero state, causing the photoisolation devices and output transistors, associated with the circuit of reference character 38, to be off, minimizing power dissipation and enabling longer component life.

Upon the occurrence of a logical one at the respective inputs 52 and 54 of a given isolation circuit, the output of NAND gate 56 saturates below 1.5 volts, so that the gallium-arsenide light emitting diode 60 of the exemplary photo isolation device 58, is foward biased and emitting light. In the exemplary photo isolation device illustrated this light passes through a clear epoxy providing the complete electrical separation required between input and output and falls upon a silicon P-N junction 62 biased in the reversed direction. As a result of the light, the reverse leakage of the reverse biased silicon P-N junction 62 is significantly increased. While photo diodes are described in the illustrative embodiment it should be recognized that photo transistors and other similar photo electric devices may be employed which will perform the same function.

Detection of the increased leakage of the light sensitive diode 62 is accomplished by means of a current level detector, generically denoted by reference character 64, utilizing a operational amplifier 50 as shown in the schematic of the circuit of reference character 38. The nominal threshold of the exemplary current detector 64 is set by the current flowing in the 1.78 meg. resistor 66 (approximately 8 micro amps). When enough current is supplied by the increased leakage of the light sensitive diode 62 to completely supply the current demanded by the 1.78 meg. resistor 66 plus a small amount to overcome the effects of input offset voltage and current, the voltage at the input to the operational amplifier 50 provided between pins 68 and 70 will be sufficient to cause the output of the operational amplifier to begin decreasing in voltage. A 20 meg. resistor 67 provided for positive feedback will tend to snap the output completely to the logical zero state as well as add approximately 1 micro amp hysteresis to the circuit. As the output of the operational amplifier 50 goes below the 15 volt supply brought into the board via electrical conductor 72, both the PNP and NPN output transistors 74 and 76, respectively, saturate, causing a logical zero on the output 78.

Since the voltage across the reverse biased light sensitive diode 62 never varies by a large amount and since a 14.7K resistor 80 is present from the diode to the +15 volt reference, the inherent capacitance of the P-N junction will not have a large effect upon the response of the light detector. The turn on and turn off times of the infrared light emitting diode are typically 1 ns. Therefore, the response time of the entire isolation circuit, exemplarily illustrated, is determined primarily by the slew rate of the operational amplifier.

All outputs of the isolation circuit are protected by a 22 volts Zener diode 82 and 200 ohm pull-up resistor 84 so that noise on those lines cannot cause permanent damage to the internal circuitry.

Total isolation of the input/output signals associated with the isolation circuit of this invention is accomplished by use of photo isolation devices, proper board layout, and wire routing to and from the circuitry card containing the separate eight isolation circuits, illustrated in FIG. 2. The exemplary photo isolation device employed is a gallium-arsenide light emitting diode and a silicon P-N junction sensitive to infrared light. The two solid state devices are mounted separately with clear epoxy positioned therebetween to allow transmission of the infrared light. The entire unit is then encapsulated in an opaque epoxy to prevent erroneous signals caused by extraneous light of the environment and to increase the voltage separation. Additionally, special care is taken, in the exemplary embodiment illustrated, so that the isolation accomplished by the photoisolation devices is not defeated by the proximity of input-output circuits.

Additional terminals are provided in the circuit of FIG. 2, designated by reference characters A1 through A8, for the purpose of providing address signals to the respective NAND gates to accomplish a multiplexing function where desired. Furthermore, the remaining isolation circuits, respectively designated by reference characters 82, 84, 86, 88, 90, 92 and 94, are identical to the circuit associated with reference character 38 with the exception that a single series regulator and Zener reference 96 is provided to supply the 15 and 30 volt voltages required by each of the separate current level detectors.

Figure 3:
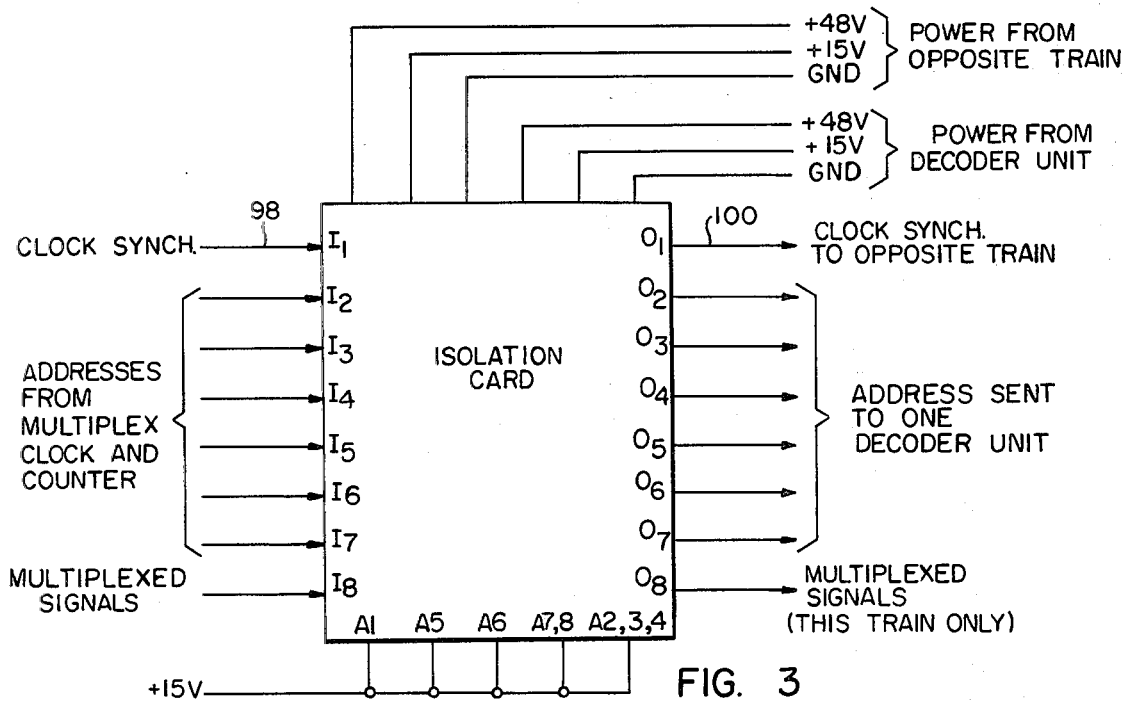
FIG. 3 is a block diagram of one exemplary embodiment illustrating the particular terminal configurations which can be employed utilizing the plurality of isolation circuits illustrated in FIG. 2.
Figure 4:
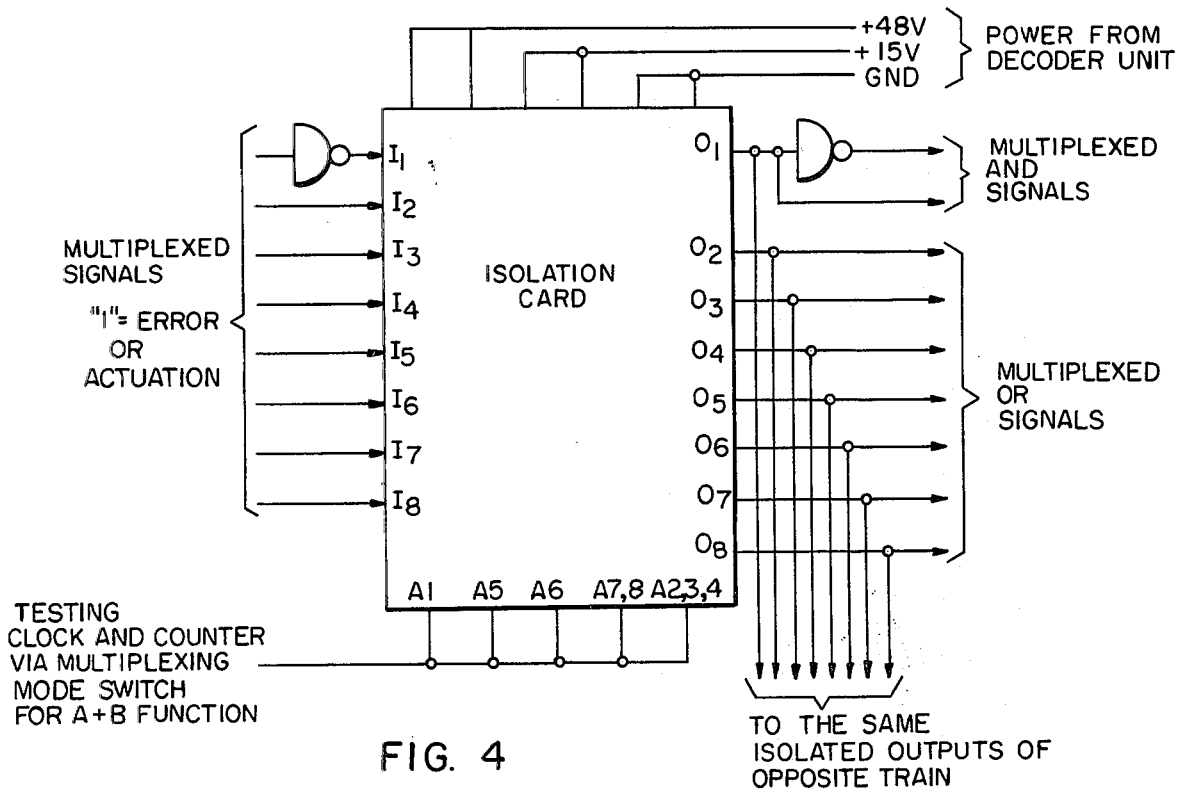
FIG. 4 is a block diagram of a second exemplary embodiment illustrating typical terminal connections which can be employed utilizing the isolation circuit of FIG. 2.

Some typical configurations utilizing the isolation card to transmit multiplex signals, addresses, and timing signals are shown in FIGS. 3 and 4. The circuit of FIG. 3 shows one such isolation card arrangement with the respective reference characters referring to the corresponding terminals in the various figures. In addition, a clock SYNCH- signal 98 and a clock SYNCH- 100 to the opposite train is provided to synchronize the information communicated by both trains. An additional arrangement used to transmit multiplexed data is illustrated in FIG. 4, and, as will be appreciated, by those skilled in the art, other similar arrangements can be achieved to accomplish the isolation required by the protection and safeguard logic systems employed within nuclear power plants.

To assure the ability of the reactor protection and safeguards system to command the necessary actuation after a single failure has occurred, this invention provides that all required redundant circuits are completely isolated, electrically and physically, from each other by means of relays, photo isolation devices, and physical construction. To assure proper operation of the photoisolation devices, the circuitry is designed, as exemplified in the embodiment set forth, to operate even if the current transfer ratio is one-half the minimum value specified and the reverse leakage is 10 times the maximum specified, while the maximum power dissipated in the light emitting diode is less than one-half the maximum allowed over the full temperature range.

Thus, the utilization of photoelectric devices in a reactor protection and safeguards logic system provides increased reliability, and reduced size and power requirements. Furthermore, the system described is directly compatible with the protection and safeguards logic system described in copending application Ser. No. 241,038 (WE Case No. 42,844). While maintaining complete isolation and still enabling communication, this system has the added advantage of being responsive to a wide frequency range including DC values. Additionally, the direct compatibility of this system with simple multiplexing subsystems minimizes the required number of isolation circuits and field wiring required, thus reducing the overall cost of nuclear power plants.

I claim as my invention:

1. An improved nuclear reactor protection and safeguard system having a plurality of sensors for monitoring reactor and environmental parameters associated with reactor operations, the sensors respectively providing an output representative of the monitored parameters which is communicated along two similar, electrically and physically isolated signal trains of logic to corresponding separate, redundant logic circuits which interpret the respective monitored signals and upon the occurrence of a predetermined combination thereof independently activate corresponding control and protection mechanisms associated with the reactor to control and protect against the occurrence of an adverse reactor operating condition, wherein the improvement comprises light communication means for effecting transmission between logic trains of the information contained therein while maintaining the electrical integrity of each train including:

light generative means, independently responsive to the logical information conveyed by each of the isolated logic signal trains to radiate a separate, corresponding representative light output indicative thereof; and light receiving means independently responsive to the light output representative of each of the logic signal trains to respectively reproduce the logical information represented thereby in electrical form for communication to the other of the two trains while maintaining electrical isolation between trains and thus the integrity and independence of each train.

2. The nuclear reactor protection and safeguard system of claim 1 wherein said light receiving means and light generative means comprise phototransistors.

3. The nuclear reactor protection and safeguard system of claim 1 wherein said light receiving means and light generative means comprise photodiodes.

4. The nuclear reactor protection and safeguard system of claim 1 wherein:

said light generative means comprises a normally off light-emitting element responsive to an electrical input from the logic train to provide a light output;

said light receiving means comprises a normally substantially non-conducting element responsive to light emitted from said light-emitting element to pass a substantial increase in current; and including a light communicative dielectric positioned between said light-emitting element and said non-conducting element to provide electrical isolation therebetween while providing a light transmission path from said light-emitting element to said non-conducting element.

5. The nuclear reactor protection and safeguard system of claim 4 wherein said substantially non-conducting element comprises a normally low leakage, reverse biased, solid state element responsive to light emitted from said light-emitting element to pass a substantial increase in the leakage current.

6. The nuclear reactor protection and safeguard system of claim 4 including means for detecting a substantial increase in current within said substantially non-conducting element.

7. The nuclear reactor protection and safeguard system of claim 6 wherein said detection means comprises a current level detector.

8. The nuclear reactor protection and safeguard system of claim 6 wherein said detection means provides an output substantially similar to the logic train input provided said light-emitting element.

9. The nuclear reactor protection and safeguard system of claim 1 wherein said light communication means effects transmission between logic trains of the information contained therein in multiplex form.

* * * * *